FRACTIONAL MICROSECOND MONOSTABLE MULTIVIBRATOR
Filed Aug. 8, 1963
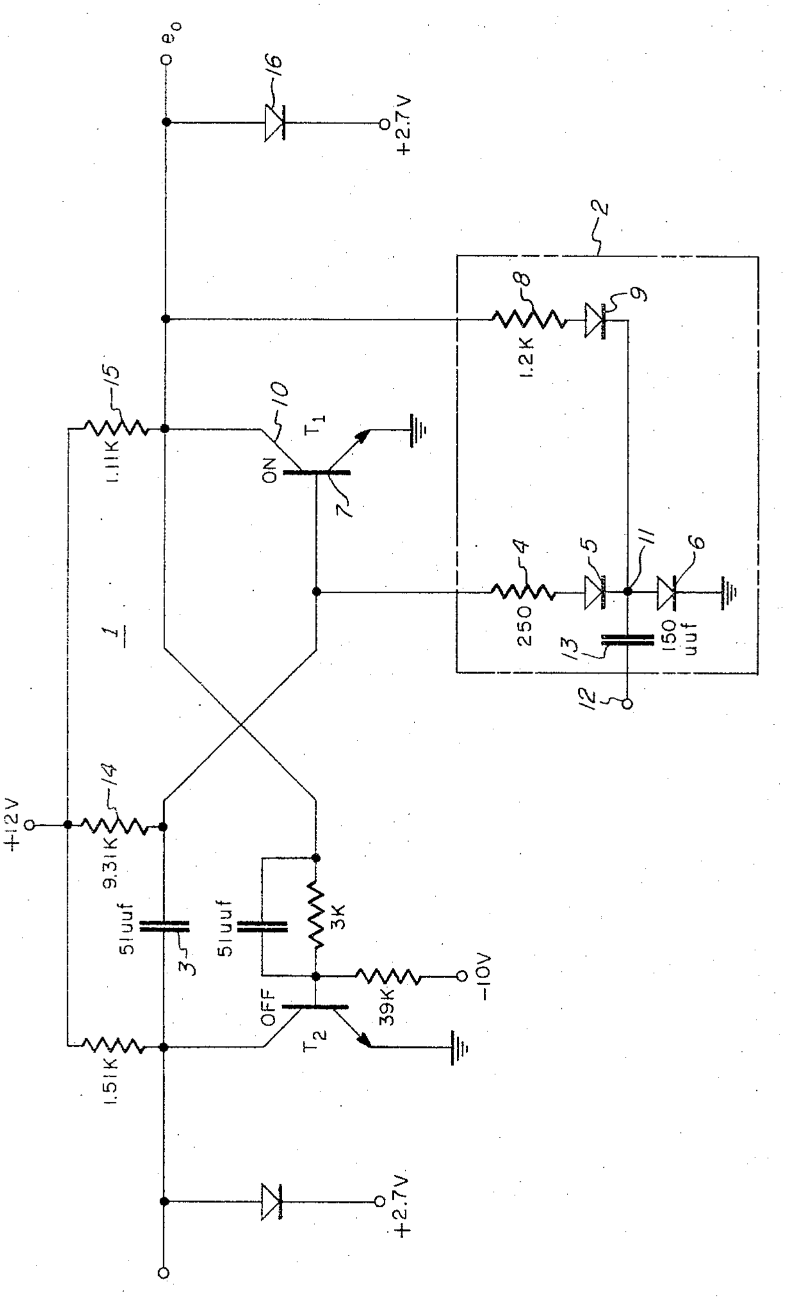
INVENTOR.
ROBERT HONG
BY Robert J. Haase
ATTORNEY United States Patent Office 3,307,043
Patented Feb. 28, 1967

3,307,043

FRACTIONAL MICROSECOND MONOSTABLE MULTIVIBRATOR

Robert Hong, Flushing, N.Y., assignor to Sperry Rand Corporation, Great Neck, N.Y., a corporation of Delaware Filed Aug. 8, 1963, Ser. No. 300,854
5 Claims. (Cl. 307—88.5)

The present invention generally relates to monostable multivibrators, and more particularly, to a transistorized monostable multivibrator adapted for the production of accurately defined output pulses having fractional microsecond duration.

Monostable multivibrators are employed widely in the art for the production of stabilized pulses of predetermined amplitude and duration for many diverse applications including signal sampling, circuit actuation and digital computer timing or clocking. Especially with the advent of high speed digital computers, increased efforts have been expended in the direction of reducing "waiting times" to a minimum, i.e., the finite time which is required for the actuation and operation of the individual circuit devices comprising the computer. The minimization of such waiting times increases computer data handling rates and reduces the time required for the solution of a given problem. It is desirable, therefore, that basic computer elements such as monostable multivibrators be designed to respond with minimum time lag to an applied actuating signal, and to produce an output signal of short duration whereby the multivibrator may be actuated repetitively at a very high rate. It is also desirable, of course, that the output pulses produced by the multivibrator be of accurately determined amplitude and duration and be relatively stable despite ambient temperature variations.

It is the principal object of the present invention to provide a transistorized monostable multivibrator capable of successive actuations within a fractional microsecond interval.

Another object is to provide a transistorized monostable multivibrator for producing an accurately defined output pulse of fractional microsecond duration.

A further object is to provide a high speed transistorized monostable multivibrator which is relatively insensitive to ambient temperature variations.

These and other objects of the present invention, as will appear from a reading of the following specification, are achieved in a preferred embodiment by the provision of a grounded emitter transistorized monostable multivibrator having an input triggering network connected to the normally "ON" transistor of the multivibrator. The input triggering network is arranged to minimize the turn off time of the "ON" transistor, to minimize undesirable coupling between the input network and the R-C timing network of the multivibrator and to increase the repetition rate capability of the multivibrator. The triggering network comprises a resistor and two diodes connected in series circuit between the base of the "ON" transistor and ground and a second resistor and a third diode connected in series circuit between the collector of the "ON" transistor and the junction point of the first two diodes. The actuating signal for triggering the multivibrator is capacitively coupled to said junction point.

For a more complete understanding of the present invention, reference should be had to the following specification and to the sole figure which is a schematic representation of a preferred embodiment.

The numeral 1 generally represents a conventional transistorized monostable multivibrator which is adapted by triggering network 2 to receive input actuating pulses. In a typical case, the multivibrator is arranged so that transistor $T_1$ is normally "ON" (saturated) and transistor $T_2$ is normally "OFF" (non-conducting). Upon the application of a negative-going pulse to network 2, transistor $T_1$ is switched temporarily to its OFF condition for a length of time which is ideally determined by the time constant of the multivibrator. Then, the multivibrator reverts from its quasi-stable state to its initial condition.

One serious problem encountered in high speed applications of prior art monostable multivibrators is the difficulty of obtaining rapid turn off of the normally ON transistor. The problem largely is attributable to the fact that the capacitor through which the input triggering pulse is applied is coupled to the multivibrator time constant capacitor for a relatively large part of the time that the multivibrator is in its quasi-stable state. The result is that the duration of the output pulse produced by he multivibrator is dependent not only on the "fall time" but also on the amplitude of the negative triggering pulse. This is especially true where very brief multivibrator output pulses are desired.

In accordance with the present invention, the switching capability of the multivibrator is substantially enhanced by a specially designed input triggering network which decouples the input capacitor from the multivibrator time constant capacitor during the time that the multivibrator is in its quasi-stable state. Returning to the figure, multivibrator 1 comprises grounded emitter transistors $T_1$ and $T_2$ which are biased and coupled to each other for conventional monostable multivibrator operation. Typical values for the circuit parameters are shown in the figure for the production of a multivibrator output pulse having a duration of about 200 nanoseconds. The duration of the output pulse depends upon the value of the time constant capacitor 3. For example, an output pulse having a duration of about 500 nanoseconds is produced when the value of the time constant capacitor is increased from the indicated 51 micromicrofarads to 150 micromicrofarads.

The input triggering network 2 comprises resistor 4 and diodes 5 and 6 which are connected in series circuit between the base 7 of transistor $T_1$ and ground. Also included within network 2 are resistor 8 and diode 9 which are connected in series circuit between the collector 10 of transistor $T_1$ and the junction point 11 between diodes 5 ond 6. Input triggering pulses are applied to terminal 12 and coupled via capacitor 13 to junction point 11.

Transistors $T_1$ and $T_2$, which are of the NPN type in the illustrative case, are quiescently biased so that transistor $T_1$ is normally ON and transistor $T_2$ is normally OFF. While transistor $T_1$ is in the ON condition and before a triggering pulse is applied to terminal 12, a minimum of current flows through resistor 4 and diodes 5 and 6 by way of resistor 14. No current flows through resistor 8 and diodes 9 and 16 because of the very low collector-emitter potential of $T_1$ at saturation. The voltage at junction point 11 in the steady-state condition is equal to the small voltage drop across forward conducting diode 6.

Upon the application of a negative-going input triggering pulse to terminal 12, the voltage at junction point 11 falls to a negative value which is essentially equal to the difference between the amplitude of the triggering pulse and the forward conduction drop across diode 6. Diode 6 becomes reversed biased by the triggering pulse whereas diode 5 is rendered conductive. Inasmuch as the potential at collector 10 of transistor $T_1$ remains at a very low value (cutting off clamping diode 16) before transistor $T_1$ switches to its OFF conditions, substantially the only source of current for recharging coupling capacitor 13 is the base 7 of transistor $T_1$. The result is that transistor $T_1$ is turned off with maximum efficiency (in the shortest time) in the effort of charging coupling capacitor 13. For temperatures nearer the upper limit of the temperature range of −55° to +125° C., the quiescent (saturated) collector potential $T_1$ may be high enough to tend to contribute some recharging current to capacitor 13. However, most of the recharging current still is drawn from the base of transistor $T_1$ because the value of resistor 8 is approximately five times the value of resistor 4.

As soon as transistor $T_1$ is switched to its OFF condition, the collector 10 rises toward the collector supply potential but is clamped to a lower value as soon as the collector potential rises sufficiently to forward-bias diode 16. Transistor $T_2$ simultaneously switches from its quiescent OFF condition to the ON condition in a conventional manner. The change in the collector potential of $T_2$ is reflected at the base 7 of transistor $T_1$ as a negative-going voltage that tends to cut off diode 5. Consequently, substantially all of the current for recharging capacitor 13 is drawn from the collector 10 of transistor $T_1$ by way of resistor 8 and diode 9. The rapid recharging of capacitor 13 from the collector of transistor $T_1$ substantially aids in the abrupt cutting off of diode 5 whereby coupling capacitor 13 of triggering network 2 is isolated from the time constant circuit of multivibrator 1 in about 20 nanoseconds following the application of the negative-going triggering pulse to terminal 12. The recharging of coupling capacitor 13 is completed in approximately 50 nanoseconds which conditions the triggering network for the reception of the next following triggering pulse at terminal 12 even before the multivibrator reverts to its initial state.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A transistorized monostable multivibrator adapted for the production of output pulses having fractional microsecond duration, said multivibrator comprising
- first and second transistors,
- means for quiescently biasing said first transistor ON and said second transistor OFF,
- an input triggering network connected to said ON transistor, said network comprising a resistor and two diodes connected in series circuit between the base and the emitter of said ON transistor,
- a second risistor and a third diode connected in series circuit between the collector of said ON transistor and the junction point of said two diodes,
- and means for coupling an input triggering pulse to said junction point.

2. A transistorized monostable multivibrator adapted for the production of output pulses having fractional microsecond duration, said multivibrator comprising
- first and second grounded emitter transistors,
- means for quiescently biasing said first transistor ON and said second transistor OFF,
- and an input triggering network connected to said ON transistor, said network comprising a resistor and two diodes connected in series circuit between the base of said ON transistor and ground,
- a second risistor and a third diode connected in series circuit between the collector of said ON transistor and the junction point of said two diodes,
- and means for coupling an input triggering pulse to said junction point.

3. A multivibrator as defined in claim 2 wherein the value of said second resistor is approximately five times the value of said first resistor.

4. The multivibrator defined in claim 2 wherein said means for coupling is a capacitor.

5. The multivibrator defined in claim 1 wherein said means for coupling is a capacitor.

References Cited by the Examiner

UNITED STATES PATENTS

| | | | |
|---|---|---|---|
| 3,171,978 | 3/1965 | Weber | 307—88.5 |
| 3,201,602 | 8/1965 | Norwalt | 328—207 |

ARTHUR GAUSS, *Primary Examiner.*

J. JORDAN, *Assistant Examiner.*